June 30, 1942.  H. L. LONG  2,288,248
HEATING MEANS FOR GREASE GUNS
Filed Oct. 7, 1940
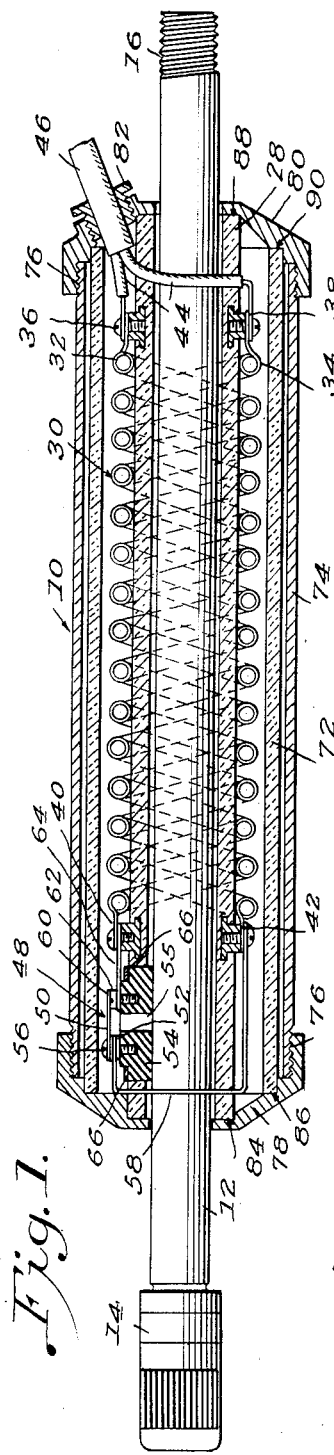
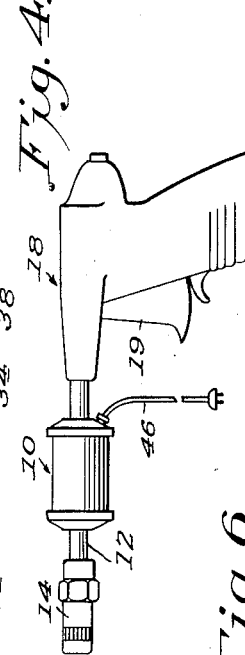
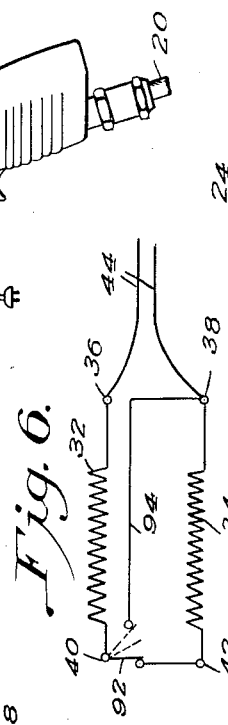
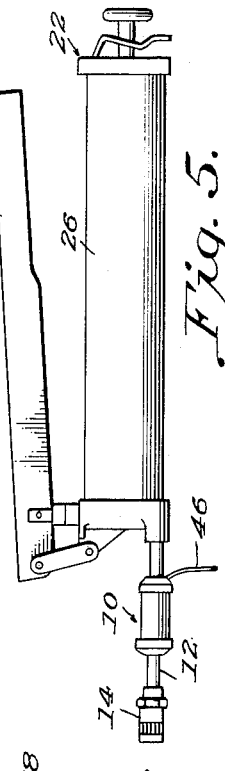
Inventor
Harry L. Long
By Leech & Radue
Attorneys Patented June 30, 1942

2,288,248

UNITED STATES PATENT OFFICE 2,288,248

HEATING MEANS FOR GREASE GUNS

Harry L. Long, Oklahoma City, Okla.

Application October 7, 1940, Serial No. 360,186

7 Claims. (Cl. 219—39)

This invention relates to heating means for grease guns such as are commonly used at service stations for automobile lubrication.

The technique of this phase of pressure lubrication has been developed to a high degree of efficiency due to the fact that many service station and garage operators regard the lubrication of automobiles as their most profitable service. For this reason the apparatus now in use must meet very critical demands and has undergone progressive refinement.

It would not be possible to stay in business today with the small hand operated grease guns prevalent a few years ago. The present commercial equipment is characterized by extremely high pressures, above 10,000 pounds per square inch in many cases, produced by streamlined air or electrically driven guns. It is also common practice to employ separate guns each containing special grease for chassis, motor, and other automobile parts, respectively. Some guns are equipped with interchangeable grease cartridges to increase their flexibility and ready adaptability to special greasing service.

However, the problem of entirely satisfactory chassis lubrication has remained unsolved, and, actually, in some respects, has become more acute with the development of high-pressure lubrication guns. High-pressure methods of lubrication succeed in forcing grease through joints, which are filled with mud, sand, dehydrated grease and corrosion residue, by channeling through the obstructions in a path of least resistance. Although only a small portion of the joint bearing is actually lubricated, it appears to the operator that the joint has been adequately treated, since he sees a small ribbon of grease emerge from the bearing end opposite the grease gun coupling. The result of such practice is that the improperly lubricated joints soon cut out and the car owner is faced with expensive re-bushing, wheel aligning jobs or other repairs.

Another problem present in automobile lubrication is that of providing a grease of sufficient consistency not to run out of the joints under the most severe summer driving conditions and yet light enough to permeate the precision fitting joints in modern automobiles when applied in an ordinary manner. In an effort to solve this latter problem grease manufacturers have used bases possessing least heat susceptibility and have combined certain fibers with the grease to give it a requisite body. These efforts have been partially successful, although the adulterants tend to cause clogging of the joints.

Accordingly, the primary object of this invention is to provide a simple and effective way of completely permeating bearing joints with new grease, and at the same time flushing out dehydrated grease, sand, and corrosion residue. This is achieved by the high-pressure injection of extremely hot grease which will tend to melt and flush out the old grease and carry with it sand, corrosion residue, and similar foreign matter.

A further general object of the present invention is to make practically possible the use of a grease of a consistency sufficient to prevent running or dripping out of the joints under the most severe conditions of summer driving. This object is attained by using a grease of high viscosity and heating it above the melting point at the time it is injected into the joints, so that it will harden within a few seconds after contacting the relatively cold joint and not run out.

A more specific object of this invention is to provide convenient heating means in the form of an accessory which may be readily adapted to any make, type or size of grease gun. This is highly important due to the fact that practically all garage and service station operators have made large investments in greasing equipment, and would not feel able to buy a complete line of new equipment in order to have heating means included therein. This means embodies an electrical heating element formed to engage a substantial length of the grease conduit between the pumping means and the hydraulic coupling, which is applied to the grease connection of a joint, to heat the grease intensely immediately prior to its entering the joint.

It is fully appreciated that various means have been provided hitherto for heating a lubricant in a receptacle to facilitate its flow into a pressure generator, for heating air or oil in a device intended only for cleaning differentials, and for steam cleaning bearings with a separate gun attachment, but none of these is adaptable to an ordinary grease gun or functions in the unique manner which has been outlined.

The above and other features of the invention will be apparent from the following detailed description of a preferred embodiment and illustrated in the accompanying drawing, in which Fig. 1 is a longitudinal vertical section of the heating means in position on the grease conduit;

Fig. 2 is a partial horizontal section of the Fig. 1 apparatus showing a detail;

Fig. 3 is a side view of the detail shown in Fig. 2;

Fig. 4 illustrates the relation of the heating means to a commercial form of pressure-operated grease gun;

Fig. 5 shows the heating means in its assembled position on a hand-actuated grease gun of common form; and Fig. 6 illustrates diagrammatically a modified arrangement of the electrical circuit for the heating means.

In the drawing, the reference numeral 10 indicates generally the electrical heating means which contacts, and preferably surrounds, a tubular grease conduit 12 having a hydraulic coupling 14 at one end and a threaded portion 16 at its other end for connection to the discharge end of a grease gun. The heating means 10 extends along a major portion of the conduit 12 which is ordinarily rigid.

In Fig. 4 the grease conduit 12 carrying the heating means or accessory device 10 is joined to a control valve 18 of the piston type, forming the discharge end of an air-pressure unit. The valve 18 is operated by a trigger member 19 and includes a flexible grease conduit 20 connected to its butt and running from the pump (not shown) which supplies grease continuously at the pressure required. Such equipment is characterized by its ease of operation and handling as a portable device.

Fig. 5 illustrates a similar application of the novel heating means 10 to a fully portable and unitary type of grease gun 22, comprising a valve control lever 24 pivoted on a hand-grip grease and pressure chamber 26. Except for the nature and arrangement of the heating element 10, this also is a commercial form of gun.

Referring again to the longitudinal section of Fig. 1, it will be seen that a tubular member 28 of porcelain or other highly heat-conducting, electrical insulating, and non-burning material is fitted over the grease conduit or nozzle 12 and serves as a base or form for an electrical heating coil 30 which consists of a parallel pair of helix resistor coils 32 and 34. At the inlet end an anchoring and terminal connection 36 for one end of resistor coil 32 is embedded in the outer portion of the tubular insulating member 28. In like manner the corresponding end of resistor coil 34 is secured by an identical and diametrically spaced terminal connection 38. The outlet or coupling end of coil 32 is similarly retained by a terminal connection 40; and coil 34 has its same end secured by a terminal connection 42, both outlet end connections being on opposite sides of tubular member 28 as before.

A pair of electric power leads 44, 44 united in a cable 46 are joined to terminal connections 36 and 38 respectively and extend adjacent one end of the heating means 10. If desired a ground lead may be included in cable 46.

As illustrated by Figs. 1, 2, and 3 a thermostat 48 is placed in series with the other pair of coil terminal connections 40 and 42, and arranged on the outer side of tubular member 28. Although other forms of thermostat may be employed, one comprising a thermostatic element 50 of the bi-metallic strip type has been found quite satisfactory. The thermostatic element 50 has an anchored end 52 on a base 54, which base is received in the member 28 so as to contact the conduit 12 with its inner face portion. Obviously the base 54 will be made from electrically insulating material of good quality which is capable of withstanding prolonged and repeated heating, e. g. a ceramic or vitreous product. Attention is next directed to an aperture 55 extending through the base 54 in a position to expose a large part of the free end of thermostatic element 50 directly to radiation from conduit 12.

The anchored end 52 of thermostatic element 50 has a screw terminal 56 to which is connected a low-resistance strip conductor 58 leading around the outside of tubular member 28 to coil terminal connection 42.

At its extremity 60, the free end of the thermostatic or thermally responsive element 50 engages a screw contact 62 when in its undistorted condition. Another low-resistance strip conductor 64 completes the circuit of heating coil 30 through terminal connection 40 and screw contact 62.

By means of a parallel pair of spring clamping bands, 66 and 66, adjacent the ends of base 54, and secured thereto by fastening means 70, 70, the thermostat 48 is secured to the outside of tubular member 28 in a way which permits ready insertion of the tubular grease conduit 12.

To prevent outward passage and loss of heat the tubular form 28 and its heating coil 30 are surrounded by a concentric layer of insulation 72 which is spaced therefrom. Fibreboard will serve for this purpose. A metallic case 74 of tube shape is fitted over the insulating layer 72 to provide a protective outside cover. The case 74 has threaded ends 76, 76 onto which are screwed metal caps 78 and 80 formed with central apertures for snugly receiving the protruding end portions of the particular grease discharge conduit 12. An insulating inlet or grommet 82 is threaded through the end of cap 80, which is adjacent the inlet end of conduit 12, to permit passage of the electrical cable 46 between inner and outer tubular members 28 and 72. A moldable plastic or asbestos composition can also be used for case 74.

In order to maintain the tubular, coil form 28 and the tubular, heat-insulating layer 72 in the proper relation to each other and to the metal case 74 stepped faces are provided on the inner ends of caps 78 and 80; that is, cap 78 has stepped faces 84 and 86 for the ends of tubular member 28 and 72, respectively, and opposed stepped faces 88 and 90 receive the other ends of the said tubular members in the order named.

The manner of assembling the heating means of this invention on a grease gun and its usual mode of operation will now be reviewed briefly. Removal of the hydraulic fitting coupling 14 is all that is required to permit the heating means 10 to be slid onto the grease conduit extension 12 where it will be more or less loosely retained between the part of the gun to which the threaded end 16 of conduit 12 is joined and coupling 14, when the latter is replaced. Some frictional resistance is afforded by engagement of the band-pressed (66) thermostat base 54 with conduit 12; and the connection of cable 46 with a source of electrical energy will tend to prevent any objectionable rotation of the heating means 10. Initially the thermostatic element 50 will engage the contact 62 to close the circuit of the heating coil 30 which is so designed that the charge of grease in conduit 12 will be heated nearly to the boiling point within a short time after connection of the cable 46. When a predetermined temperature has been attained sufficient heat will have reached thermostatic element 50 through aperture 55 to cause said element to distort and its free end 60 to move from the full line, closed circuit position of Figs. 1 and 3 to the dotted, open circuit position illustrated in Fig. 3. Once the conduit 12 and the heating means 10 have been thus warmed, the operator will have available for use as rapidly as needed charges of hot, liquid grease which will thoroughly flush and penetrate the joint bearings before hardening into an ordinary grease consistency remaining for lubricating purposes.

To provide flexibility in the operation of the heating means, the electrical circuit therefor may be modified as shown in Fig. 6. In this arrangement the thermostat is omitted and two-way switch means 92 of conventional form, which may be operated from outside the device, is employed to connect, (as shown dotted) one resistor coil, 32, to the terminal of a suitably insulated and disposed lead 94 which shunts out the other resistor coil, 34. By so doing, a more intense heating effect is made available, which will be found convenient when heavier summer greases are being used in the grease gun. For use with the lighter winter greases, the switch means 92 will be operated, as indicated by solid lines, to place both resistor coils in series in the circuit. An intermediate position, which is also shown dotted, permits the grease gun operator to open the electric circuit at the point of operation.

In the manner which has been disclosed any grease gun can readily be adapted to perform this improved method of greasing at moderate expense, or an equivalent installation of heating means can be more permanently incorporated in the gun or conduit at the time of manufacture. The location of the heating means adjacent the hydraulic coupling fitting and on the grease conduit extension has been found most efficient and involves no modification or alteration of the control valve structure to handle a lubricant of greatly different consistency.

It is to be recognized that the illustrative embodiment of this invention which has been described in detail can be varied in construction and arrangement without departing from the spirit of the invention as defined in the appended claims.

What I claim as novel and desire to secure by Letters Patent of the United States is:

1. In combination with a grease gun having a grease conduit provided with hydraulic coupling means adapted for connection to a coupling on a bearing joint, a heating means constructed and arranged highly to heat the grease while within said conduit and immediately prior to its discharge through said coupling means.

2. In combination with a grease gun having a grease conduit provided with coupling means for cooperation with the grease connection of a bearing joint, an electrical heating element in contact with said conduit and acting upon a substantial portion of its length, said element being adapted to heat highly the grease while within said conduit and immediately prior to its discharge through said coupling means.

3. In combination with a grease gun having a discharge conduit provided with hydraulic coupling means adapted for connection to a cooperating coupling on a bearing joint, an electrical heating element in contact with said conduit immediately adjacent its hydraulic coupling means and adapted highly to heat the grease within said conduit before injection into a bearing.

4. In combination with a grease gun having a discharge conduit provided with a hydraulic coupling for cooperation with the grease connection of a bearing joint, electrical heating means carried by said conduit and constructed and arranged highly to heat the grease within said conduit, and thermostat means associated with said heating means for limiting to a predetermined extent the temperature within said conduit.

5. Heating means for grease guns comprising, in combination, an inner tubular member of electrical-insulating and highly heat-conducting material adapted to be fit around the discharge conduit of a grease gun, an electrical heating element carried on the inner tubular member, a thermostat connected in series with the heating element and directly exposed to heat emanating from the grease conduit, an outer tubular member of heat-insulating material spaced from and covering the inner tubular member and the heating element, said thermostat being within said outer tubular member, a protective casing member enclosing the tubular members and having opposite central apertures concentric with the inner tubular member for receiving the discharge conduit, and an electrical cable operatively connected with the heating coil and extending through the casing adjacent one end.

6. Heating means for grease guns comprising, in combination, an inner tubular member of electrical-insulating and highly heat-conducting material adapted to be fitted over and closely encircle the extension conduit of a grease gun; an electrical heating resistor supported on the outer surface of the inner tubular member; a thermostat in series with the resistor and including a thermostatic element and an apertured base of heat-conducting material, said base being arranged to engage the conduit of the gun in use with the aperture positioned in such a manner as directly to expose the thermostatic element to heat emanating from the conduit; spring means for retaining the thermostat in position with respect to the inner tubular member and providing frictional engagement between the base thereof and the conduit; an outer tubular member of heat-insulating material covering the inner tubular member and the resistor; a casing member enclosing the tubular members and having central apertures at its opposite ends for closely fitting the extension conduit; and means for supplying electrical energy to the heating resistor within the casing member.

7. In combination with a grease gun having a discharge conduit provided with a hydraulic coupling for cooperation with the grease connection of a bearing joint, electrical heating means supported in closely spaced relation to said conduit and constructed and arranged to heat the grease within said conduit, and means associated with said heating means for varying its heating effect.

HARRY L. LONG.